United States Patent
Hart et al.

(10) Patent No.: US 8,033,949 B2
(45) Date of Patent: *Oct. 11, 2011

(54) MULTI-SPEED TRANSMISSION

(75) Inventors: James M. Hart, Belleville, MI (US);
James B. Borgerson, Clarkston, MI (US); Scott H. Wittkopp, Ypsilanti, MI (US); Andrew W. Phillips, Rochester, MI (US); Clinton E. Carey, Highland, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,283

(22) Filed: Mar. 1, 2010

(65) Prior Publication Data
US 2010/0197443 A1    Aug. 5, 2010

Related U.S. Application Data

(63) Continuation of application No. 11/689,138, filed on Mar. 21, 2007, now Pat. No. 7,699,741.

(51) Int. Cl.
*F16H 3/44* (2006.01)
(52) U.S. Cl. ........................... 475/282
(58) Field of Classification Search .......... 475/271, 475/275, 277, 282, 330
See application file for complete search history.

(56) References Cited

U.S. PATENT DOCUMENTS

| | | |
|---|---|---|
| 6,176,803 B1 | 1/2001 | Meyer et al. |
| 6,342,026 B1 | 1/2002 | Takagi |
| 6,547,688 B2 | 4/2003 | Takagi |
| 6,558,287 B2 | 5/2003 | Hayabuchi et al. |
| 6,736,751 B1 | 5/2004 | Usoro |
| 6,743,139 B1 | 6/2004 | Usoro |
| 6,743,140 B1 | 6/2004 | Lee |
| 6,743,142 B1 | 6/2004 | Lee |
| 6,743,143 B1 | 6/2004 | Usoro |
| 6,743,144 B1 | 6/2004 | Lee |
| 6,746,357 B1 | 6/2004 | Usoro |
| 6,752,736 B1 | 6/2004 | Lee |
| 6,755,765 B2 | 6/2004 | Usoro |
| 6,758,784 B2 | 7/2004 | Lee |
| 6,758,787 B2 | 7/2004 | Usoro |
| 6,764,424 B1 | 7/2004 | Usoro |
| 6,764,425 B2 | 7/2004 | Lee |
| 6,764,426 B2 | 7/2004 | Lee |
| 6,767,307 B1 | 7/2004 | Lee |
| 6,811,512 B2 | 11/2004 | Usoro |
| 6,837,823 B2 | 1/2005 | Lee |
| 6,852,059 B2 | 2/2005 | Lee |
| 6,960,149 B2 | 11/2005 | Ziemer |

(Continued)

FOREIGN PATENT DOCUMENTS

AU    2005324989    7/2006

(Continued)

*Primary Examiner* — Justin Holmes

(57) ABSTRACT

A transmission is disclosed having an input member, an output member, a plurality of planetary gear sets, a plurality of interconnecting members and a plurality of torque-transmitting mechanisms. The plurality of planetary gear sets has first, second and third members. The input member is continuously interconnected with a member of the planetary gear sets. The output member is continuously interconnected with another member of the planetary gear sets. At least eight forward speeds and one reverse speed are produced by the selective engagement of the five torque-transmitting mechanisms.

15 Claims, 2 Drawing Sheets

U.S. PATENT DOCUMENTS

| | | |
|---|---|---|
| 7,011,597 B2 | 3/2006 | Haka |
| 7,014,589 B2 | 3/2006 | Stevenson |
| 7,101,305 B2 | 9/2006 | Tabata et al. |
| 7,128,683 B2 | 10/2006 | Oguri |
| 7,163,484 B2 | 1/2007 | Klemen |
| 7,497,802 B2 | 3/2009 | Kamm et al. |
| 7,614,975 B2 * | 11/2009 | Seo ............................... 475/278 |
| 7,775,931 B2 * | 8/2010 | Carey et al. .................... 475/276 |
| 2005/0090362 A1 | 4/2005 | Abe et al. |
| 2006/0019791 A1 | 1/2006 | Baldwin |
| 2006/0270513 A1 | 11/2006 | Klemen |
| 2006/0270514 A1 | 11/2006 | Oguri |
| 2006/0270516 A1 | 11/2006 | Klemen |
| 2007/0225108 A1 | 9/2007 | Kamm et al. |
| 2007/0232437 A1 | 10/2007 | Kamm et al. |
| 2007/0232438 A1 | 10/2007 | Kamm et al. |
| 2007/0232439 A1 | 10/2007 | Kamm et al. |
| 2007/0238573 A1 | 10/2007 | Kamm et al. |
| 2007/0270276 A1 | 11/2007 | Kamm et al. |
| 2007/0281820 A1 | 12/2007 | Kamm et al. |
| 2007/0287573 A1 | 12/2007 | Kamm et al. |
| 2008/0009382 A1 | 1/2008 | Kamm et al. |
| 2008/0009384 A1 | 1/2008 | Diosi et al. |
| 2008/0009385 A1 | 1/2008 | Kamm et al. |
| 2008/0015074 A1 | 1/2008 | Kamm et al. |
| 2008/0015077 A1 | 1/2008 | Kamm et al. |
| 2008/0015080 A1 | 1/2008 | Kamm et al. |
| 2008/0015081 A1 | 1/2008 | Kamm et al. |
| 2008/0064556 A1 | 3/2008 | Kamm et al. |
| 2008/0153653 A1 | 6/2008 | Diosi et al. |
| 2008/0161149 A1 | 7/2008 | Diosi et al. |
| 2008/0171627 A1 | 7/2008 | Wittkopp et al. |
| 2008/0269004 A1 | 10/2008 | Diosi et al. |
| 2009/0112425 A1 | 4/2009 | Popp et al. |
| 2009/0176612 A1 | 7/2009 | Popp et al. |
| 2009/0305838 A1 * | 12/2009 | Borgerson et al. ............ 475/276 |

FOREIGN PATENT DOCUMENTS

| | | |
|---|---|---|
| DE | 102005032931 | 1/2007 |
| DE | 102008001049 | 10/2009 |

* cited by examiner

| GEAR STATE | GEAR RATIO | CLUTCHES | | | | |
|---|---|---|---|---|---|---|
| | | 90 | 92 | 82 | 80 | 84 |
| REV | -3.653 | X | X | | | X |
| N | | O | O | | | |
| 1ST | 4.600 | X | X | | X | |
| 2ND | 3.067 | X | X | X | | |
| 3RD | 2.013 | | X | X | X | |
| 4TH | 1.600 | | X | X | | X |
| 5TH | 1.244 | | X | | X | X |
| 6TH | 1.000 | | | X | X | X |
| 7TH | 0.848 | X | | | X | X |
| 8TH | 0.667 | X | | X | | X |

O = ENGAGED NOT CARRYING TORQUE
X = ENGAGED CARRYING TORQUE

MULTI-SPEED TRANSMISSION

CROSS-REFERENCE TO RELATED APPLICATIONS

The present patent application is a continuation of U.S. application Ser. No. 11/689,138, filed Mar. 21, 2007, which claims priority to U.S. Provisional Application No. 60/879,957, filed on Jan. 25, 2007.

TECHNICAL FIELD

The invention relates to a multi-speed transmission having both a plurality of planetary gear sets and torque transmitting devices that are selectively engageable to achieve multiple gear ratios.

BACKGROUND

A typical multi-speed transmission uses a combination of friction clutches and planetary gear arrangements to achieve a plurality of gear ratios. The number and placement of the planetary gear sets, generally, are dictated by packaging, cost and desired speed ratios.

While conventional transmissions achieve their intended purpose, the need for new and improved transmission configurations continues with the design of lighter and more compact vehicles. Accordingly, there is a need for a cost-effective, compact and multi-speed transmission.

SUMMARY

A transmission is provided having an input member, an output member, a plurality of planetary gear sets, a plurality of interconnecting members and a plurality of torque-transmitting mechanisms. The plurality of planetary gear sets has first, second and third members. The input member is continuously interconnected with the second member of the second planetary gear set. The output member is continuously interconnected with the second member of the fourth planetary gear set. A first interconnecting member continuously interconnects the first member of the first planetary gear set with the first member of the second planetary gear set. A second interconnecting member continuously interconnects the second member of the first planetary gear set with the third member of the fourth planetary gear set. A third interconnecting member continuously interconnects the third member of the second planetary gear set with the first member of the third planetary gear set. A fourth interconnecting member continuously interconnects the second member of the third planetary gear set with a second member of the fourth planetary gear set. A first torque-transmitting mechanism selectively interconnects the first member of the first planetary gear set with a stationary member. A second torque-transmitting mechanism selectively interconnects the third member of the first planetary gear set with the stationary member. A third torque-transmitting mechanism selectively interconnecting the second member of the second planetary gear set with the first member of the fourth planetary gear set. A fourth torque-transmitting mechanism selectively interconnects the first member of the third planetary gear set with the first member of fourth planetary gear set. A fifth torque-transmitting mechanism selectively interconnects the third member of the third planetary gear set with the first member of the fourth planetary gear set. The torque-transmitting mechanisms are engageable in combinations of at least three to establish at least eight forward speed ratios and at least one reverse speed ratio between the input member and the output member.

In another aspect of the present invention, the first member is a sun gear.

In yet another aspect of the present invention, the second member is a carrier member.

In yet another aspect of the present invention, the third member is a ring gear.

In yet another aspect of the present invention, the input member is continuously connected to the carrier member of the second planetary gear set.

In yet another aspect of the present invention, the output member is continuously connected to the carrier member of the fourth planetary gear set.

In yet another aspect of the present invention, the third torque-transmitting mechanism selectively interconnects a carrier member of the second planetary gear set with a sun gear of the fourth planetary gear set.

In yet another aspect of the present invention, the third torque-transmitting mechanism selectively interconnects the input member with a sun gear of the fourth planetary gear set.

In yet another aspect of the present invention, the fourth torque-transmitting mechanism selectively interconnects a sun gear of the third planetary gear set with a sun gear of the fourth planetary gear set.

In yet another aspect of the present invention, the fourth torque-transmitting mechanism selectively interconnects a sun gear of the fourth planetary gear set with a sun gear of the third planetary gear set and a ring gear of the second planetary gear set.

In yet another aspect of the present invention, the fifth torque-transmitting mechanism selectively interconnects a ring gear of the third planetary gear set with a sun gear of the fourth planetary gear set.

In yet another aspect of the present invention, the first interconnecting member continuously interconnects a sun gear of the first planetary gear set with a sun gear of the second planetary gear set.

In yet another aspect of the present invention, the second interconnecting member continuously interconnects a carrier member of the first planetary gear set with a ring gear of the fourth planetary gear set.

In yet another aspect of the present invention, the third interconnecting member continuously interconnects a ring gear of the second planetary gear set with a sun gear of the third planetary gear set.

In yet another aspect of the present invention, the fourth interconnecting member continuously interconnects a carrier member of the third planetary gear set with a carrier member of the fourth planetary gear set.

In yet another aspect of the present invention, the first torque-transmitting mechanism selectively interconnects a sun gear of the first planetary gear set with the stationary member.

In yet another aspect of the present invention, the first torque-transmitting mechanism selectively interconnects a sun gear of the first planetary gear set and a sun of the second planetary gear set with the stationary member.

In yet another aspect of the present invention, the second torque-transmitting mechanism selectively interconnects a ring gear of the first planetary gear set with the stationary member.

In still another aspect of the present invention, the selective interconnection created by the first, second and fifth torque-transmitting mechanisms produce a reverse gear ratio.

In still another aspect of the present invention, the selective interconnection created by the first, second and third torque-transmitting mechanisms produce a first gear ratio.

In still another aspect of the present invention, the selective interconnection created by the first, second and fourth torque-transmitting mechanisms produce a second gear ratio.

In still another aspect of the present invention, the selective interconnection created by the second, third and fourth torque-transmitting mechanisms produce a third gear ratio.

In still another aspect of the present invention, the selective interconnection created by the second, fourth and fifth torque-transmitting mechanisms produce a fourth gear ratio.

In still another aspect of the present invention, the selective interconnection created by the second, third and fifth torque-transmitting mechanisms produce a fifth gear ratio.

In still another aspect of the present invention, the selective interconnection created by the third, fourth and fifth torque-transmitting mechanisms produce a sixth gear ratio.

In still another aspect of the present invention, the selective interconnection created by the first, third and fifth torque-transmitting mechanisms produce a seventh gear ratio.

In still another aspect of the present invention, the selective interconnection created by the first, fourth and fifth torque-transmitting mechanisms produce an eighth gear ratio.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
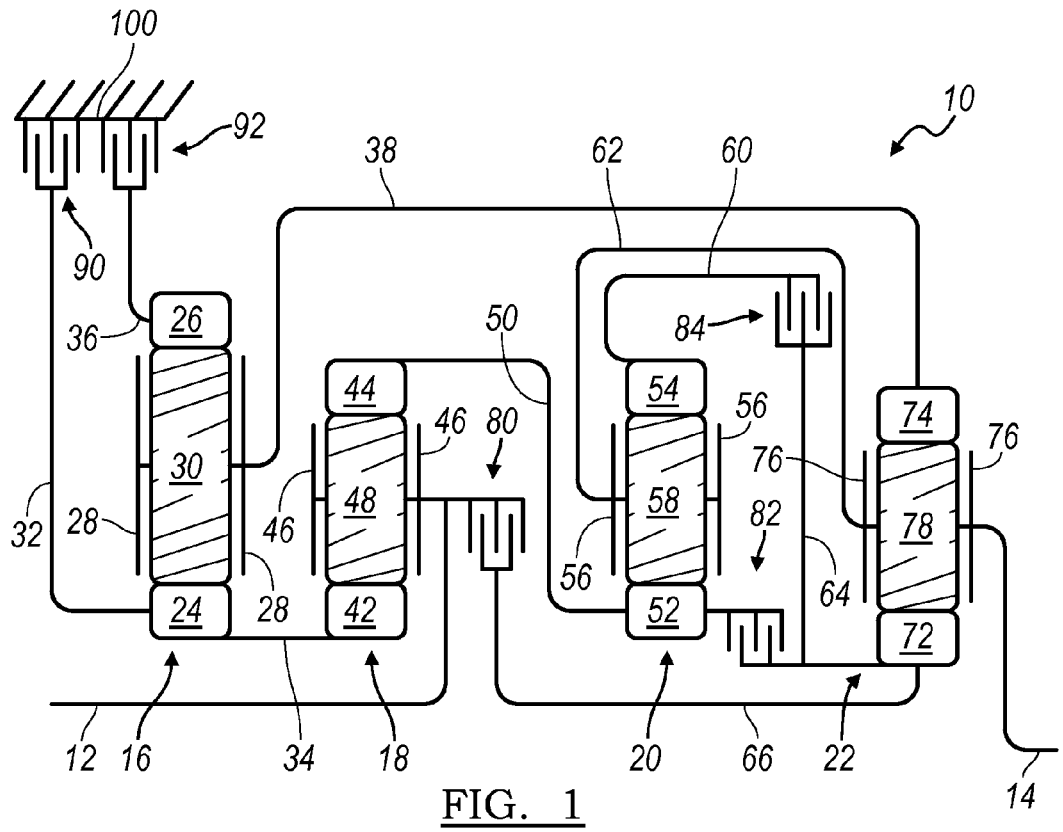
FIG. 1 is a schematic representation of an embodiment of a transmission in accordance with the present invention.
FIG. 2 is a truth table listing the engaged torque-transmitting mechanisms for selected torque ratios achieved by the transmission of FIG. 1.

Referring to the drawings, wherein like reference numbers refer to like components, in FIG. 1 a multi-speed transmission 10 is depicted. The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or to a turbine of a torque converter (not shown). The output shaft 14 is continuously connected with the final drive unit or transfer case (not shown).

Transmission 10 includes four planetary gear sets 16, 18, 20 and 22. The planetary gear sets 16, 18, 20 and 22 are connected between the input shaft 12 and the output shaft 14. In a preferred embodiment of the present invention, planetary gear set 16 is a simple planetary gear set that includes a sun gear member 24, a ring gear member 26 and a carrier member 28 that rotatably supports a set of pinion gears 30 (only one shown). Sun gear member 24 is connected for common rotation with first outer shaft 32 and first intermediate shaft 34. Ring gear member 26 is connected for common rotation with second outer shaft 36. Pinion gears 30 are configured to intermesh with sun gear member 24 and ring gear member 26. Carrier member 28 is connected for common rotation with second intermediate shaft 38.

In a preferred embodiment of the present invention, planetary gear set 18 is a simple planetary gear set. More specifically, planetary gear set 18 includes a sun gear member 42, a ring gear member 44 and a carrier member 46 that rotatably supports a set of pinion gears 48 (only one shown). Sun gear member 42 is connected for common rotation with first intermediate shaft 34. Ring gear member 44 is connected for common rotation with a third intermediate shaft 50. Carrier member 46 is connected for common rotation with an input shaft 12. Pinion gears 48 are configured to intermesh with both sun gear member 42 and ring gear member 44.

In a preferred embodiment of the present invention, planetary gear set 20 is a simple planetary gear set that includes a sun gear member 52, a ring gear member 54 and a carrier member 56 that rotatably supports a set of pinion gears 58 (only one shown). Sun gear member 52 is connected for common rotation with a third intermediate shaft 50. Ring gear member 54 is connected for common rotation with fourth intermediate shaft 60. Carrier member 56 is connected for common rotation with fifth intermediate shaft 62. Pinion gears 58 are configured to intermesh with both sun gear member 52 and ring gear member 54.

In a preferred embodiment of the present invention, planetary gear set 22 is a simple planetary gear set that includes a sun gear member 72, a ring gear member 74 and a carrier member 76 that rotatably supports a set of pinion gears 78 (only one shown). Sun gear member 72 is connected for common rotation with sixth intermediate shaft 64 and seventh intermediate shaft 66. Ring gear member 74 is connected for common rotation with second intermediate shaft 38. Carrier member 76 is connected for common rotation with an output shaft 14. Pinion gears 78 are configured to intermesh with both sun gear member 72 and ring gear member 74.

The transmission 10 includes a variety of torque-transmitting mechanisms or devices including a first intermediate clutch 80, a second intermediate clutch 82, a third intermediate clutch 84, a first brake 90 and a second brake 92. First intermediate clutch 80 is selectively engageable to connect seventh intermediate shaft 66 to carrier member 46 and input shaft 12. Second intermediate clutch 82 is selectively engagable to connect sixth intermediate shaft 64 to sun gear member 52. Third intermediate clutch 84 is selectively engagable to connect fourth intermediate shaft 60 to sixth intermediate shaft 64. Brake 90 is selectively engageable to connect outer shaft 32 to transmission housing 100 to restrict rotation of shaft 32 relative to housing 100. Brake 92 is selectively engageable to connect outer shaft 36 to housing 100 to restrict rotation of shaft 36 relative to housing 100.

The transmission 10 is capable of transmitting torque from the input shaft 12 to the output shaft 14 in at least eight forward torque ratios and one reverse torque ratio as indicated in the truth table of FIG. 2. Each of the forward torque ratios and the reverse torque ratios is attained by engagement of one or more of the torque-transmitting mechanisms (i.e. first intermediate clutch 80, a second intermediate clutch 82, a third intermediate clutch 84, a brake 90 and a brake 92). Those skilled in the art will readily understand that a different speed ratio is associated with each torque ratio. Thus, at least eight forward speed ratios and at least one reverse speed ratio may be attained by transmission 10. An example of the gear ratios that may be obtained using the embodiments of the present invention are also shown in FIG. 2. Of course, other gear ratios are achievable depending on the gear diameter, gear tooth count and gear configuration selected.

Figure 3:
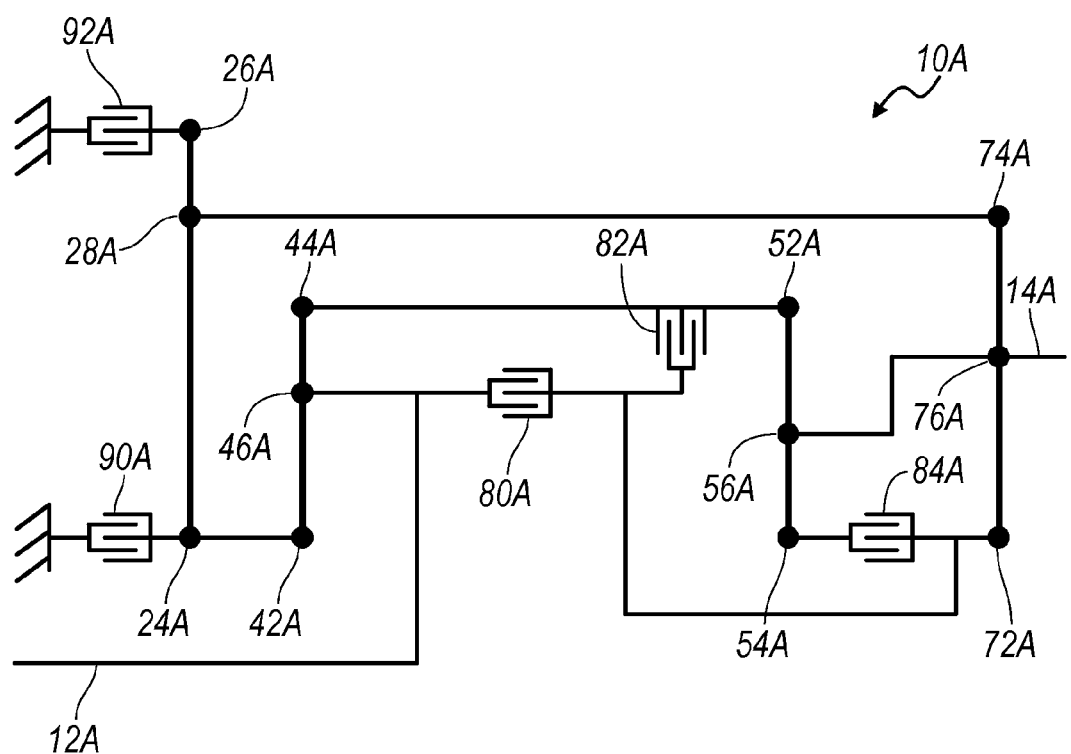
FIG. 3 is a lever diagram of the transmission of FIG. 1 illustrating the power flow from the input through the gear sets to the output, in accordance with the present invention.

A lever diagram 10A is shown in FIG. 3 that is representative of transmission 10 of FIG. 1, as well as the connections for the clutches 80, 82, 84 and brakes 90, 92. The nodes 24A, 26A, 28A, 42A, 44A, 46A, 52A, 54A, 56A, 72A, 74A and 76A of the lever diagram 10A represent the gear members 24, 26, 28, 42, 44, 46, 52, 54, 56, 72, 74 and 76 of FIG. 1 such that the same numerical designation with the addition of an A suffix is used to identify the corresponding node. For example, the nodes 24A and 42A shown in FIG. 3 represent sun gears 24 and 42 respectively shown in FIG. 1. Other components of FIG. 3 have the same numbering convention for the corresponding components in FIG. 1. Moreover, the operation or engagement of clutches 80, 82, 84 and brakes 90, 92 to establish the various forward and reverse gear speeds will now be described with continuing reference to FIGS. 1, 2 and 3.

To establish the reverse torque ratio (Rev), the torque-transmitting mechanisms or clutches are selected as set forth in the table of FIG. 2. As shown in FIG. 2, first and second brakes 90, 92 and third intermediate clutch 84 are engaged to achieve the reverse torque ratio (Rev).

In neutral, none of the clutches or brakes are carrying torque. As noted in FIG. 2, in this gear state, the first and second brakes 90 and 92 are engaged but not carrying torque.

A first forward torque ratio (listed as 1st (first gear) in the truth table of FIG. 2), is achieved by engaging first and second brakes 90 and 92 and first intermediate clutch 80. An arrow is provided in FIG. 2 that emanates from third intermediate clutch 84 that is released and points to the clutch that is engaged (clutch 80), when transitioning from reverse through neutral to first gear.

A subsequent forward torque ratio, indicated as $2^{nd}$ (second gear) in FIG. 2, is established by engagement of first and second brakes 90, 92 and second intermediate clutch 82. The shift from first gear to second gear occurs as follows: releasing first intermediate clutch 80 and engaging second intermediate clutch 82 while maintaining engagement of brakes 90, 92. An arrow is provided in FIG. 2 that emanates from the clutch that is released (clutch 80) and points to the clutch that is engaged (clutch 82).

The subsequent torque ratio, indicated as $3^{rd}$ (third gear) in the truth table of FIG. 2, is established by the engagement of second brake 92, first and second intermediate clutches 80 and 82. The shift from second gear to third gear occurs as follows: clutch 82 and brake 92 remain engaged, brake 90 is released and clutch 80 is engaged. An arrow is provided in FIG. 2 that emanates from the brake that is released (brake 90) and points to the clutch that is engaged (clutch 80).

The next subsequent forward torque ratio, indicated as $4^{th}$ (fourth gear) in the truth table of FIG. 2, is established with the engagement of second brake 92, second and third intermediate clutches 82, 84. The shift from third gear to fourth gear is achieved as follows: engagement of clutch 82 and brake 92 are maintained, clutch 80 is released and clutch 84 is engaged. An arrow is provided in FIG. 2 that emanates from the clutch that is released (clutch 80) and points to the clutch that is engaged (clutch 84).

A subsequent forward torque ratio indicated as $5^{th}$ (fifth gear) in FIG. 2, is established with the engagement of second brake 92 and first and third intermediate clutches 80 and 84. The shift from fourth gear to fifth gear occurs as follows: the engagement of clutch 84 and second brake 92 are maintained, clutch 82 is released and clutch 80 is engaged. An arrow is provided in FIG. 2 that emanates from the clutch that is released (clutch 82) and points to the clutch that is engaged (clutch 80).

A subsequent forward torque ratio indicated as $6^{th}$ (sixth gear), in the truth table of FIG. 2, is established with the engagement of first, second and third intermediate clutches 80, 82 and 84. The shift from fifth gear to sixth gear occurs as follows: the engagement of clutches 80 and 84 are maintained, brake 92 is released and clutch 82 is engaged. An arrow is provided in FIG. 2 that emanates from the brake that is released (brake 92) and points to the clutch that is engaged (clutch 82).

The next subsequent torque ratio, indicated as $7^{th}$ (seventh gear) in the truth table of FIG. 2, is established with the engagement of brake 90 and first and third intermediate clutches 80, 84. The shift from sixth gear to seventh gear occurs as follows: the engagement of clutches 80 and 84 are maintained, clutch 82 is released and brake 90 is engaged. An arrow is provided in FIG. 2 that emanates from the clutch that is released (clutch 82) and points to the brake that is engaged (brake 90).

The next subsequent torque ratio, indicated as $8^{th}$ (eight gear) in the truth table of FIG. 2, is established with the engagement of brake 90 and second and third intermediate clutches 82, 84. The shift from seventh gear to eighth gear occurs as follows: the engagement of clutch 84 and brake 90 are maintained, clutch 80 is released and clutch 82 is engaged. An arrow is provided in FIG. 2 that emanates from the clutch that is released (clutch 80) and points to the clutch that is engaged (clutch 82).

The present invention contemplates that downshifts follow the reverse sequence of the corresponding upshift (as described above), and several power-on skip-shifts that are single-transition are possible (e.g. from 1st to 3rd).

While the best modes for carrying out the invention have been described in detail, those familiar with the art to which this invention relates will recognize various alternative designs and embodiments for practicing the invention within the scope of the appended claims.

The following is claimed:

1. A transmission comprising:
   an input member;
   an output member;
   first, second, third and fourth planetary gear sets including first, second, third, and fourth rotational members, wherein the input member is fixedly connected with the second planetary gear set and the output member is fixedly connected with the fourth rotational member; and
   first, second, third, fourth, and fifth torque-transmitting mechanisms each selectively engageable to interconnect at least one of the first, second, third, and fourth planetary gear sets with at least one other of the first planetary gear set, the second planetary gear set, the third planetary gear set, the fourth planetary gear set, and a stationary member, wherein the first, second, and fifth torque-transmitting mechanisms are engaged to define the reverse gear ratio, the first, second, and fourth torque-transmitting mechanisms are engaged to define a first gear ratio, the first, second, and third torque-transmitting mechanisms are engaged to define a second gear ratio, the second, third, and fourth torque-transmitting mechanisms are engaged to define a third gear ratio, the second, third, and fifth torque-transmitting mechanisms are engaged to define a fourth gear ratio, the second, fourth, and fifth torque-transmitting mechanisms are engaged to define a fifth gear ratio, the third, fourth, and fifth torque-transmitting mechanisms are engaged to define a sixth gear ratio, the first, fourth, and fifth torque-transmitting mechanisms are engaged to define a seventh gear ratio, and the first, third, and fifth torque-transmitting mechanisms are engaged to define an eighth gear ratio.

2. The transmission of claim 1 wherein the first rotational member is formed by a carrier of the first planetary gear set and a ring gear of the fourth planetary gear set.

3. The transmission of claim 1 wherein the second rotational member is formed by a sun gear of the first planetary gear set and a sun gear of the second planetary gear set.

4. The transmission of claim 1 wherein the third rotational member is formed by a ring gear of the second planetary gear set and a sun gear of the third planetary gear set.

5. The transmission of claim 1 wherein the fourth rotational member is formed by a carrier member of the third planetary gear set and a carrier member of the fourth planetary gear set.

6. The transmission of claim 1 wherein the input is fixedly connected to a carrier member of the second planetary gear set.

7. A transmission comprising:
an input member;
an output member;
first, second, third and fourth planetary gear sets each having first, second and third members, wherein the first member of the first planetary gear set is rotationally coupled with the first member of the second planetary gear set, the second member of the first planetary gear set is rotationally coupled with the third member of the fourth planetary gear set, the third member of the second planetary gear set is rotationally coupled with the first member of the third planetary gear set, and the second member of the third planetary gear set is rotationally coupled with the second member of the fourth planetary gear set; and
five torque-transmitting mechanisms each selectively engageable to interconnect at least one of the first, second, and third members with at least one other of the first members, second members, third members, and a stationary member, and
wherein the torque-transmitting mechanisms are selectively engageable in combinations of at least three to establish at least eight forward speed ratios and at least one reverse speed ratio between the input member and the output member.

8. The transmission of claim 7 wherein a first of the five torque-transmitting mechanisms is selectively engageable to rotationally couple the first member of the first planetary gear set with the stationary member.

9. The transmission of claim 7 wherein a second of the five torque-transmitting mechanisms is selectively engageable to rotationally couple the third member of the first planetary gear set with the stationary member.

10. The transmission of claim 7 wherein a third of the five torque-transmitting mechanisms is selectively engageable to rotationally couple the second member of the second planetary gear set with the first member of the fourth planetary gear set.

11. The transmission of claim 7 wherein a fourth of the five torque-transmitting mechanisms is selectively engageable to rotationally couple the first member of the third planetary gear set with the first member of fourth planetary gear set.

12. The transmission of claim 7 wherein a fifth of the five torque-transmitting mechanisms is selectively engageable to rotationally couple the third member of the third planetary gear set with the first member of the fourth planetary gear set.

13. The transmission of claim 7 wherein the input member is rotationally coupled with the second member of the second planetary gear set and the output member is rotationally coupled with the second member of the fourth planetary gear set.

14. The transmission of claim 7 wherein the first, second, and third members of the first, second, third, and fourth planetary gear sets are each one of a sun gear, a ring gear, and a carrier member.

15. The transmission of claim 7 wherein the first members are sun gears, the second members are carrier.

* * * * *